United States Patent
Nair et al.

(10) Patent No.: US 10,567,723 B2
(45) Date of Patent: Feb. 18, 2020

(54) SYSTEM AND METHOD FOR DETECTING LIGHT SOURCES IN A MULTI-ILLUMINATED ENVIRONMENT USING A COMPOSITE RGB-IR SENSOR

(71) Applicant: SAMSUNG ELECTRONICS CO., LTD., Suwon-si (KR)

(72) Inventors: Prajit Sivasankaran Nair, Suwon-si (KR); Bala Siva Sashank Jujjavarapu, Karnataka (IN); Narasimha Gopalakrishna Pai, Karnataka (IN); Akshay Kumar, Karnataka (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 10 days.

(21) Appl. No.: 16/102,255

(22) Filed: Aug. 13, 2018

(65) Prior Publication Data

US 2019/0052855 A1   Feb. 14, 2019

(30) Foreign Application Priority Data

Aug. 11, 2017 (IN) .................. 201641027634(CS)

(51) Int. Cl.
*H04N 9/73* (2006.01)
*G02B 5/20* (2006.01)
(Continued)

(52) U.S. Cl.
CPC ............ *H04N 9/735* (2013.01); *G02B 5/208* (2013.01); *H04N 5/332* (2013.01); *H04N 9/04553* (2018.08)

(58) Field of Classification Search
CPC ..................................................... H04N 9/735
(Continued)

(56) References Cited

U.S. PATENT DOCUMENTS 8,553,103 B1   10/2013   Samadani et al.
8,994,848 B2   3/2015   Husoy
(Continued)

FOREIGN PATENT DOCUMENTS

JP   61-214890 A   9/1986

OTHER PUBLICATIONS

International Search Report (PCT/ISA/210), issued by International Searching Authority in corresponding International Application No. PCT/KR2018/009213, dated Nov. 13, 2018.
(Continued)

*Primary Examiner* — Joel W Fosselman
(74) *Attorney, Agent, or Firm* — Sughrue Mion, PLLC

(57) ABSTRACT

A system and a method for detecting light sources in a multi-illuminated environment using a composite red-green-blue-infrared (RGB-IR) sensor is provided. The method comprises detecting, by the composite RGB-IR sensor, a multi-illuminant area using a visible raw image and a near-infrared (NIR) raw image of a composite RGBIR image, dividing each of the visible raw image and the NIR raw image into a plurality of grid samples, extracting a plurality of illuminant features based on a green/NIR pixel ratio and a blue/NIR pixel ratio, estimating at least one illuminant feature for each grid sample by passing each grid sample through a convolution neural network (CNN) module using the extracted plurality of illuminant features, and smoothing each grid sample based on the estimated at least one illuminant feature.

18 Claims, 7 Drawing Sheets

(51) Int. Cl.
*H04N 5/33* (2006.01)
*H04N 9/04* (2006.01)

(58) Field of Classification Search
USPC ..................................................... 348/223.1
See application file for complete search history.

(56) References Cited

U.S. PATENT DOCUMENTS

| | | |
|---|---|---|
| 2002/0131635 A1 | 9/2002 | Cooper |
| 2014/0078349 A1 | 3/2014 | Velichko et al. |
| 2015/0062347 A1 | 3/2015 | Jin |
| 2016/0057367 A1 | 2/2016 | Lee |
| 2017/0111623 A1 | 4/2017 | Hung |
| 2017/0249339 A1* | 8/2017 | Lester ................ G06K 9/00979 |

OTHER PUBLICATIONS

Written Opinion (PCT/ISA/237) issued by the International Searching Authority in corresponding International Application No. PCT/KR2018/009213, dated Nov. 13, 2018.
Simone et al. "Single and Multiple Illuminant Estimation Using Convolutional Neural Networks" ArXiv e-prints, 1508.00998v2, Dec. 11, 2015 (pp. 1-14).
Clement Fredembach et al. "Illuminant estimation and detection using near-infrared" Digital Photography V. International Society for Optics and Photonics, Jan. 19, 2009 (pp. 1-11).

* cited by examiner

SYSTEM AND METHOD FOR DETECTING LIGHT SOURCES IN A MULTI-ILLUMINATED ENVIRONMENT USING A COMPOSITE RGB-IR SENSOR

CROSS-REFERENCE TO RELATED APPLICATION(S)

This application is based on and claims priority under 35 U.S.C. § 119(a) of an Indian patent application number 201641027634, filed on Aug. 11, 2017, the disclosure of each of which is incorporated by reference herein in its entirely.

BACKGROUND

1. Field

Apparatuses and methods consistent with example embodiments relate relates to an image processing system and a method for detecting light sources in a multi-illuminated environment using a composite red-green-blue-infrared (RGB-IR) sensor.

2. Description of Related Art

The color of objects viewed in a scene is affected by the lighting conditions under which the scene is viewed. A viewer's eyes and brain compensate for different types of light. White object appears white to a viewer whether it is viewed in sunlight, or indoors under incandescent or fluorescent light. In cameras, an auto-white balance (AWB) function helps to compensate for different types of lighting, to render a white object white. Therefore, correct illuminant detection (light source detection) is an important part of accurately capturing any scene.

Illuminant estimation is a primary step during image processing in a camera that uses an AWB process to remove a color cast in an image and thus improve the color in the scene. Existing AWB processes uses only single light source or illuminant. Therefore, it is difficult to detect multiple illuminants using only a single red-green-blue (RGB) image, and thus using only a single RGB image provides incorrect detection of illuminant results in color cast. Existing methods also provide improved estimates of an illuminant only at the expense of processing time.

In the related art, a statistic-based method determines a single illuminant scenario using visible and near-infrared (NIR) spectrums. Data for the results are generated from a modified digital single lens reflex (DSLR) camera having a Bayer sensor with a NIR-cutoff filter removed manually from the sensor module. Camera can capture either visible or NIR light by placing an appropriate filter in front of the lens. The sensor does not have a specific IR pixel which can capture wavelength 850 nm+/−150 nm. The system captures visible wavelengths (390 nm~700 nm) with an IR-cutoff-filter. The system captures from visible to NIR spectrums (wavelength 390 nm to 1200 nm) when the NIR cut-off filter is removed manually. In the absence of an NIR cut-off filter, Bayer pixels receive some amount of NIR crosstalk along with the visible spectrum which is used for an illuminant estimation. Thus, this method faces challenges in multi-illuminant scenarios.

Another related art system proposes a learning-based technique using a convolutional neural network (CNN) for single and multiple illuminant scenarios. The system and the method utilize existing datasets from a Bayer sensor and use relighting techniques to synthetically generate multi-illuminant scenarios. The results are restricted two illuminant scenarios.

Another related art proposes local estimation method a Bayer sensor to improve detection in a multi-illuminant scenario.

Based on the related art, it is observed that the required sensor pixel characteristics are not explicitly addressed, which is essential for designing an accurate illuminant estimator. The applicability of illuminant detection methods for image sensors with visible and NIR pixels or in a dual sensor with separate visible and NIR pixel array or in single visible (e.g. RGB) sensor without NIR cut-off filter have not been exhaustively studied. Further, there is needed an illuminant detection system and method for a composite RGB-IR sensor without an IR-cut-off filter.

The above information is presented as background information only to assist with understanding of the disclosure. No determination has been made, and no assertion is made, as to whether any of the above might be applicable as prior art with regard to the disclosure.

SUMMARY

One or more example embodiments may address at least the above-mentioned problems and/or disadvantages and provide at least the advantages described below.

Accordingly, one or more example embodiments may provide a system and a method for detecting light sources in a multi-illuminated environment using a composite red-green-blue-infrared (RGB-IR) sensor.

According to an aspect of an example embodiment, a method for detecting light sources in a multi-illuminated environment using a composite RGB-IR sensor, the method comprises steps of detecting, by the composite RGB-IR sensor, a multi-illuminant area using a visible raw image and a near-infrared (NIR) raw image of a composite RGBIR image, dividing the visible and the NIR raw images into a number of grid samples, extracting a plurality of illuminant features using a green/NIR pixel ratio and a Blue/NIR pixel ratio, estimating at least one illuminant feature for each grid sample by passing each grid sample through a convolution neural network (CNN) module using the extracted illuminant features, and smoothing each grid sample based on the estimated at least one illuminant feature.

The CNN module may learn the green/NIR and blue/NIR ratio and thus improves accuracy without using the ratio of red/NIR pixel by using only two components, green and blue pixel, from visible range, which helps in an improved differentiation among multiple illuminants using RGB and NIR information and also reduces memory usage in the detection unit.

The method may further comprise applying an auto-white-balance (AWB) to each of the smoothed grid sample.

The CNN may be trained with a pre-defined set of standard illuminants and natural lighting along with ground truth illuminant information.

The estimating at least one illuminant feature for each grid sample may comprise measuring an angular error of the RGB-IR image by comparing the estimated plurality of illuminant features with the pre-defined set of standard illuminants stored in the CNN, and selecting the at least one illuminant feature based on the measured angular error.

The providing the pre-defined set of standard illuminants to the CNN may comprise capturing a single image using the RGB-IR sensor, separating the image into at least an R layer, a G layer, a B layer, and an IR layer, dividing each of an input RGB and an input NIR image into patches of a pre-defined size, and providing the CNN with a pre-defined sized input image and a corresponding known illuminant estimate.

The illuminant may comprise one or more light sources present in a scene captured by the RGB-IR sensor. The one or more light sources may include, but are not limited to: fluorescent light, tungsten light, and the like.

According to an aspect of an example embodiment, a user equipment (UE) is provided for detecting light sources in a multi-illuminated environment using a composite RGB-IR sensor. The UE comprises a composite RGB-IR sensor adapted for detecting a multi-illuminant area using a visible raw image and an NIR raw image from of a composite RGBIR image, and an image processor adapted for dividing each of the visible raw image and the NIR raw image into a number of grid samples, extracting a plurality of illuminant features based on a green/NIR pixel ratio and a blue/NIR pixel ratio, and estimating at least one illuminant feature for each grid sample by passing each grid sample through a CNN module using the extracted illuminant features.

The foregoing has outlined, in general, various example aspects and is to serve as an aid to better understanding the more complete detailed description which is to follow. In reference to such, there is to be a clear understanding that the embodiments described herein are merely exemplary. It is intended that any other advantages and objects that become apparent or obvious from the detailed description or illustrations contained herein are within the scope of the present Application.

BRIEF DESCRIPTION OF THE DRAWINGS

The above and other example aspects, features and advantages of example embodiments will be more apparent from the following description taken in conjunction with the accompanying drawings, in which.

Throughout the drawings, it should be noted that like reference numbers are used to depict like elements, features, and structures.

DETAILED DESCRIPTION

Figure 1:
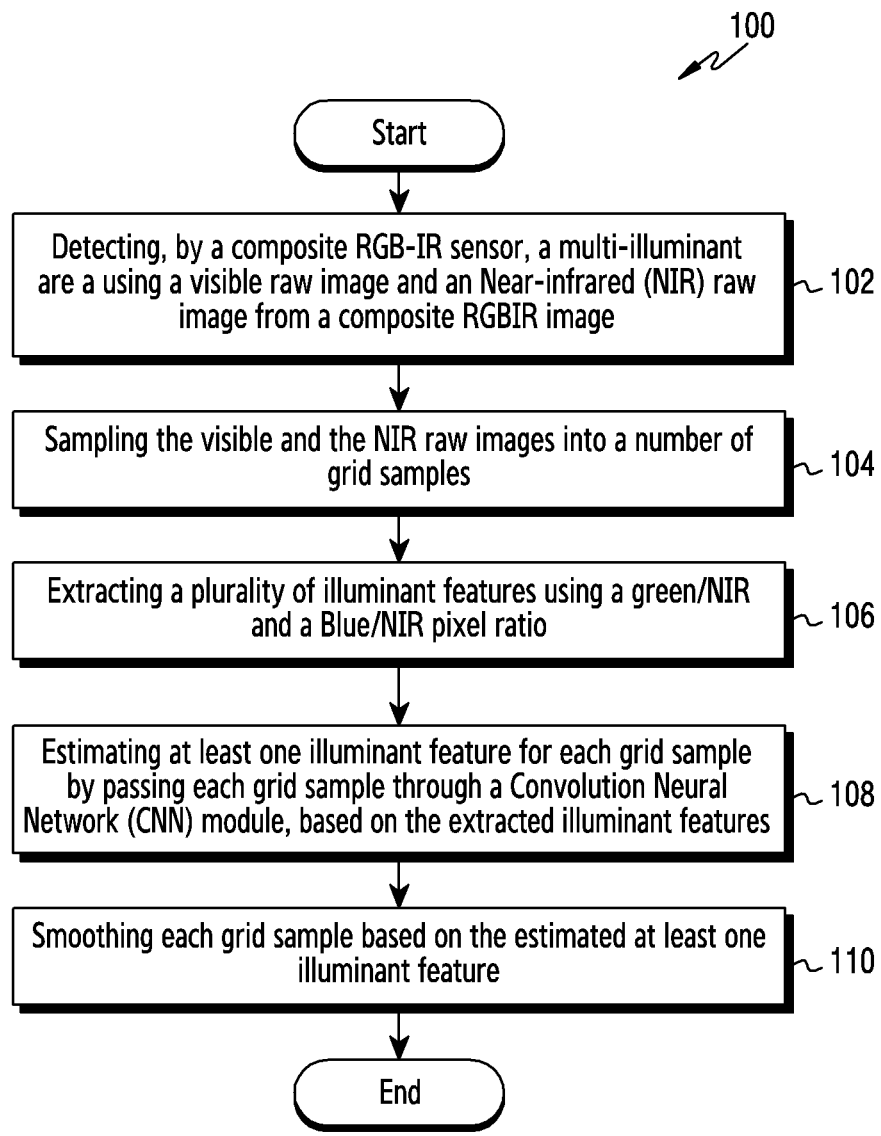
FIG. 1 is a flow chart illustrating a method for detecting light sources in a multi-illuminated environment using a composite red-green-blue-infrared (RGB-IR) sensor, according to an example embodiment.

The following description with reference to the accompanying drawings is provided to assist in a comprehensive understanding of various embodiments as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit. In addition, descriptions of well-known functions and constructions may be omitted for clarity and conciseness.

The terms and words used in the following description and claims are not limited to the bibliographical meanings, but are merely used by the inventor to enable a clear and consistent understanding. Accordingly, it should be apparent to those skilled in the art that the following description of various embodiments is provided for illustration purposes only and not for the purpose of limiting the disclosure as defined by the appended claims and their equivalents.

The specification may refer to "an", "one" or "some" embodiment(s) in several locations. This does not necessarily imply that each such reference is to the same embodiment(s), or that the feature only applies to a single embodiment. Single features of different embodiments may also be combined to provide other embodiments.

It is to be understood that the singular forms "a," "an," and "the" include plural referents unless the context clearly dictates otherwise. Thus, for example, reference to "a component surface" includes reference to one or more of such surfaces. It is further understood that the terms "includes", "comprises", "including" and/or "comprising" when used in this disclosure, specify the presence of stated features, integers, steps, operations, elements and/or components, but do not preclude the presence or addition of one or more other features integers, steps, operations, elements, components, and/or groups thereof. As used herein, the term "and/or" includes any and all combinations and arrangements of one or more of the associated listed items.

Unless otherwise defined, all terms (including technical and scientific terms) used herein have the same meaning as commonly understood by one of ordinary skill in the art to which this disclosure pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Example embodiments provide a system and method for detecting light sources in a multi-illuminated environment using a composite red-green-blue-infrared (RGB-IR) sensor, wherein the system can be any of image capturing devices such as, but not limited to, camera, mobile phone, laptop, tablet, personal digital assistant (PDA), and the like. A person having ordinarily skilled in the art can understand that the described example embodiments use cases are for better understanding and illustration, but do not limit to scope.

In view of the above discussion of the related art, there is a need for a system and a method that uses an average of two illuminants to overcome the limitations of the related art systems. Further, there is a need for a system and a method that detects multi-illuminants using composite RGB-IR sensor without an IR cut-off filter According to an example embodiment, a method is provided for detecting light sources in a multi-illuminated environment using a composite RGB-IR sensor. The method comprises the composite RGB-IR sensor detecting a multi-illuminant area using a visible raw image and a near-infrared (NIR) raw image of a composite RGBIR image. The user captures one or more images and the composite RGBIR sensor of a user equipment (UE) receives the one or more images. Upon receiving and processing, the RGB-IR sensor identifies that there are multi-illuminant areas present in the visible raw image. Further, the composite RGB-IR sensor also processes the image to obtain an NIR raw image and a composite RGBIR image and identifies presence of multi-illuminant areas. In an example embodiment, the illuminant comprises one or more light sources present in a scene being captured.

Further, the method comprises dividing the visible and the NIR raw images into a number of grid samples. Based on the identification, the RGB-IR sensor divides the visible and NIR raw images into number of grid samples. In an example embodiment, the number or size of the grid samples depends on at least one parameter including, but not limited to, image size, processing time, performance, and the like. In another example embodiment, the sampling of the visible and the NIR raw images is performed using at least one of, but not limited to, grid-based sampling, segmentation-based sampling, sparse sampling, and the like. A person having ordinary skill in the art can understand that any known image sampling method can be used for sampling the visible and NIR raw images, without departing from the scope of the example embodiments.

Further, the method comprises extracting a plurality of illuminant features using a green/NIR pixel ratio and a blue/NIR pixel ratio. From the sampled visible and NIR raw images, plurality of illuminant features can be extracted using green/NIR pixel ratio and a blue/NIR pixel ratio. In another embodiment, plurality of illuminant features can be extracted using inverse pixel ratios, NIR/green and NIR/blue, without departing from the scope. Further, the method comprises estimating at least one illuminant feature for each grid sample by passing each grid sample through a convolution neural network (CNN) module using the extracted illuminant features. A person of ordinary skill in the art can understand a CNN module and its workings, and thus a detailed description is not included herein. According to an example embodiment, the CNN is trained with a pre-defined set of standard illuminants and natural lighting along with ground truth illuminant information, wherein different types of illuminants include, but are not limited to, variants of tungsten, variants for fluorescent, daylight, and the like.

In an example embodiment, the CNN module learns the green/NIR pixel ratio and blue/NIR ratio and thus improves accuracy without requiring the use of a red/NIR pixel ratio. This method uses only two components of the visible range, the green and blue pixels, which helps in a better differentiation of multiple illuminants using RGB and NIR information and also reduces memory usage in the detection unit.

In an example embodiment, estimating at least one illuminant feature for each grid sample comprises measuring an angular error of the RGBIR image by comparing the estimated plurality of illuminant features with the pre-defined set of standard illuminants stored in the CNN, and selecting the at least one illuminant feature based on the measured angular error.

In another example embodiment, providing the pre-defined set of standard illuminants to the CNN comprises capturing a single image from the RGB-IR sensor, separating the image into at least four layers R, G, B, IR, dividing an input RGB image and an input NIR image into patches of a pre-defined size, and providing the CNN with a pre-defined size input image and a corresponding illuminant estimate; where the illuminant estimate of each patch is known as they are captured under controlled lighting conditions. In an example embodiment, the patch size for the input RGB and NIR images can be 4 blocks of 32 pixels×32 pixels. In another example embodiment, the input RGB and NIR image patches can be of any known size, as would be understood by one of ordinary skill in the art.

Further, the method comprises smoothing each grid sample based on the estimated at least one illuminant feature. Based on the estimation performed by the CNN module, each grid of the visible and NIR raw images are smoothed based on the estimated at least one illuminant feature.

In an example embodiment, the method further comprises applying an auto-white-balance (AWB) on each of the smoothed grid samples. Upon smoothing each of the grid samples, AWB is applied to each of the grid samples.

FIG. 1 is a flow chart 100 illustrating a method for detecting light sources in a multi-illuminated environment using a composite RGB-IR sensor, according to an example embodiment. According to the flow chart 100, at operation 102, the composite RGB-IR sensor detects a multi-illuminant area using a visible raw image and a NIR raw image from a composite RGBIR image. According to another example embodiment, an image processor may be configured to detect the multi-illuminant area using the visible raw image and the NIR raw image of the composite RGBIR image. Further, at operation 104, the visible and the NIR raw images are divided into a number of grid samples.

Further, at operation 106, a plurality of illuminant features are extracted using a green/NIR pixel ratio and a blue/NIR pixel ratio. Further, at operation 108, at least one illuminant feature for each grid sample is estimated by passing each grid sample through a CNN module using the extracted illuminant features. Further, at operation 110, each grid sample is smoothed based on the estimated at least one illuminant feature.

Figure 2:
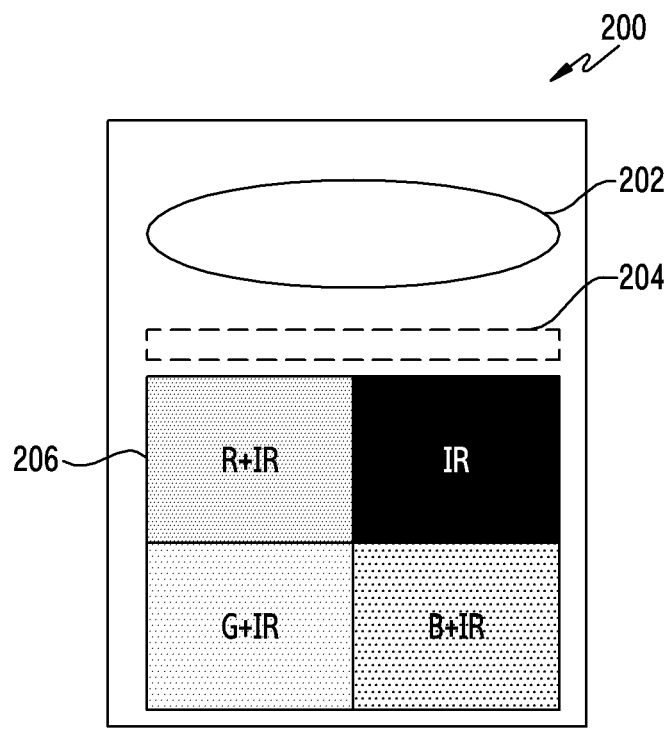
FIG. 2 is a schematic diagram illustrating pixel layout of a composite image sensor, according to an example embodiment.

FIG. 2 is a schematic diagram 200 illustrating a pixel layout of a composite image sensor, according to an example embodiment. According to FIG. 2, the diagram 200 comprises a lens 202, an infrared (IR) cut filter 204 and an image sensor 206. According to another example embodiment, the diagram 200 may not comprise the IR cut filter 204. When a pixel of a composite image is monitored under the composite image sensor, then four layers can be observed including a red IR layer, a green IR layer, a blue IR layer, and an IR layer.

Figure 3:
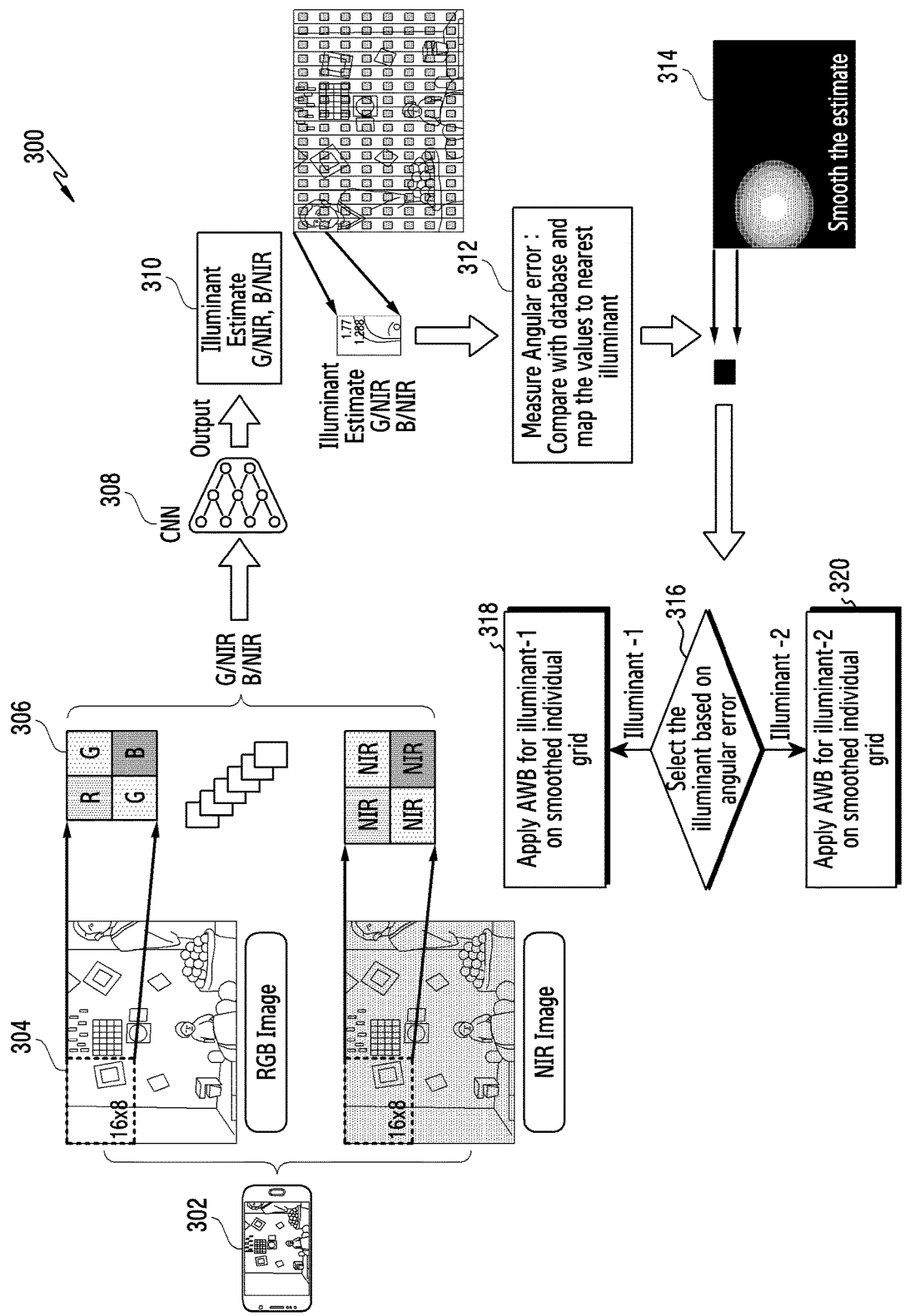
FIG. 3 is a flow chart illustrating a detailed flow of a method for detecting light sources in a multi-illuminated environment using a composite RGB-IR sensor, according to an example embodiment.

FIG. 3 is a flow chart 300 illustrating a detailed flow of a method for detecting light sources in a multi-illuminated environment using a composite RGB-IR sensor, according to an example embodiment. According to the flow chart 300, at operation 302, a camera unit of a mobile phone with a composite image sensor provides visible and NIR images in a single frame, upon capturing one or more images. At operation 304, an NIR image can be separated from the composite image, wherein the composite image can be a RGB image with RGB values for each pixel, and the NIR image comprises IR values for each pixel. The images can have a resolution of 16 pixels×8 pixels, or any other resolution as would be understood by one of skill in the art.

At operation 306, for the separated RGB and NIR images, an average value of each patch can be identified. Further, at operation 308, from the obtained average value of each patch, values of green NIR (GNIR), and blue NIR (BNIR) are extracted and provided for the CNN to obtain ratio of pixel values.

At operation 310, the output obtained from the CNN provides illuminant estimates for GNIR and BNIR. At operation 312, an angular error is measured by comparing the illuminant estimate with value stored in a database, and the values are mapped to the nearest illuminant. Based on the measured angular error, at operation 314, the illuminant estimate is smoothed.

The smoothed image can be obtained, and at operation 316, the composite sensor of the image checks which illuminant needs to be selected based on the angular error. Based on the angular error, either illuminant 1 or illuminant 2 can be selected. If illuminant 1 is selected, then at operation 318, AWB can be applied to the smoothed individual grid. If illuminant 2 is selected, then at operation 320, AWB can be applied to the smoothed individual grid.

Figure 4:
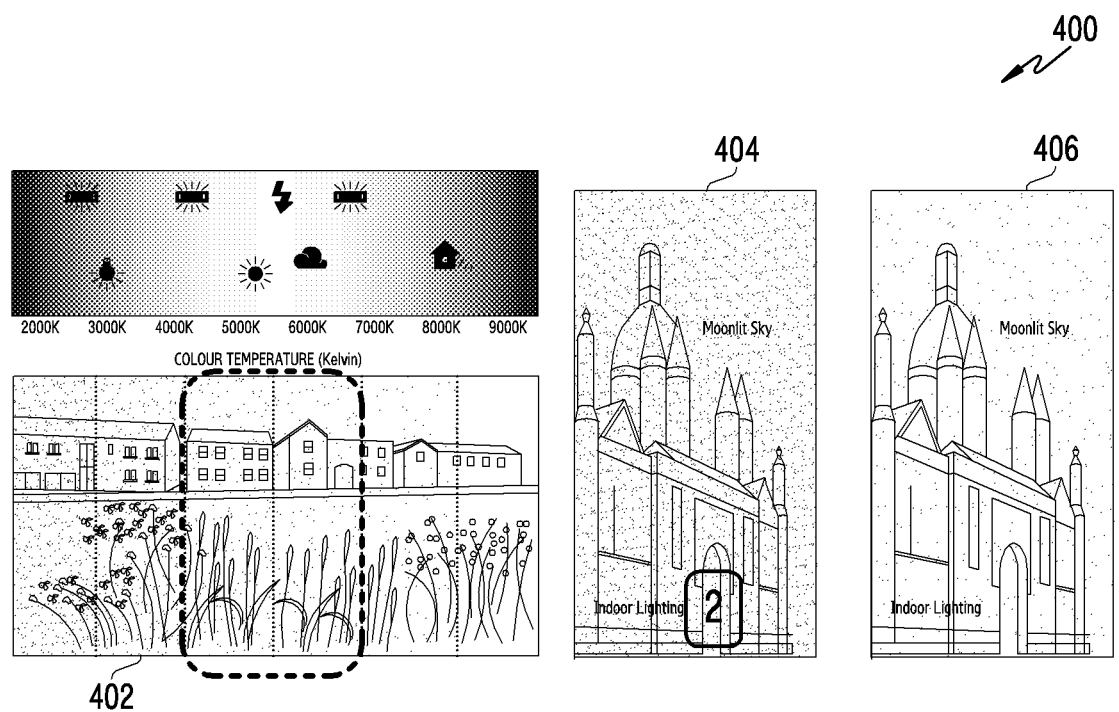
FIG. 4 is a schematic diagram illustrating comparisons among different types of light sources, according to an example embodiment.

FIG. 4 is a schematic diagram 400 illustrating a comparison between different types of light sources, according to an example embodiment. According to FIG. 4, an original image 402 is captured during daylight. According to an example embodiment, even though, there is only one illumination source in the image, the composite image sensor identifies different temperatures present in the image 402 and each shade is due to a different light source. Based on the different temperatures in the image, the composite image sensor identifies an illuminant estimate using CNN. Further, the composite image sensor smoothes the image based on the identified illuminant estimate and applies AWB to the image to obtain the corrected image.

Further, FIG. 4 illustrates a changing of the scene color based on the light source, according to an example embodiment. According to FIG. 4, the composite image sensor identifies the illuminant source and changes the color based on the illuminant. In the first image 404, the composite image sensor identifies two light sources: a light source from the moonlit sky and another light source from indoor light. The composite image sensor references the indoor light source and identifies the illuminant estimate based on the indoor light. Upon identifying the illuminant estimate, the white balance of the image can be adjusted based on tungsten or another indoor light, such as fluorescent light.

In the second image 406, the composite image sensor identifies the moonlit sky as the illuminant source and identifies the illuminant estimate based on the moonlit sky. Upon identifying the illuminant estimate, the white balance of the image can be adjusted based on light from a moonlit sky.

Figure 5:
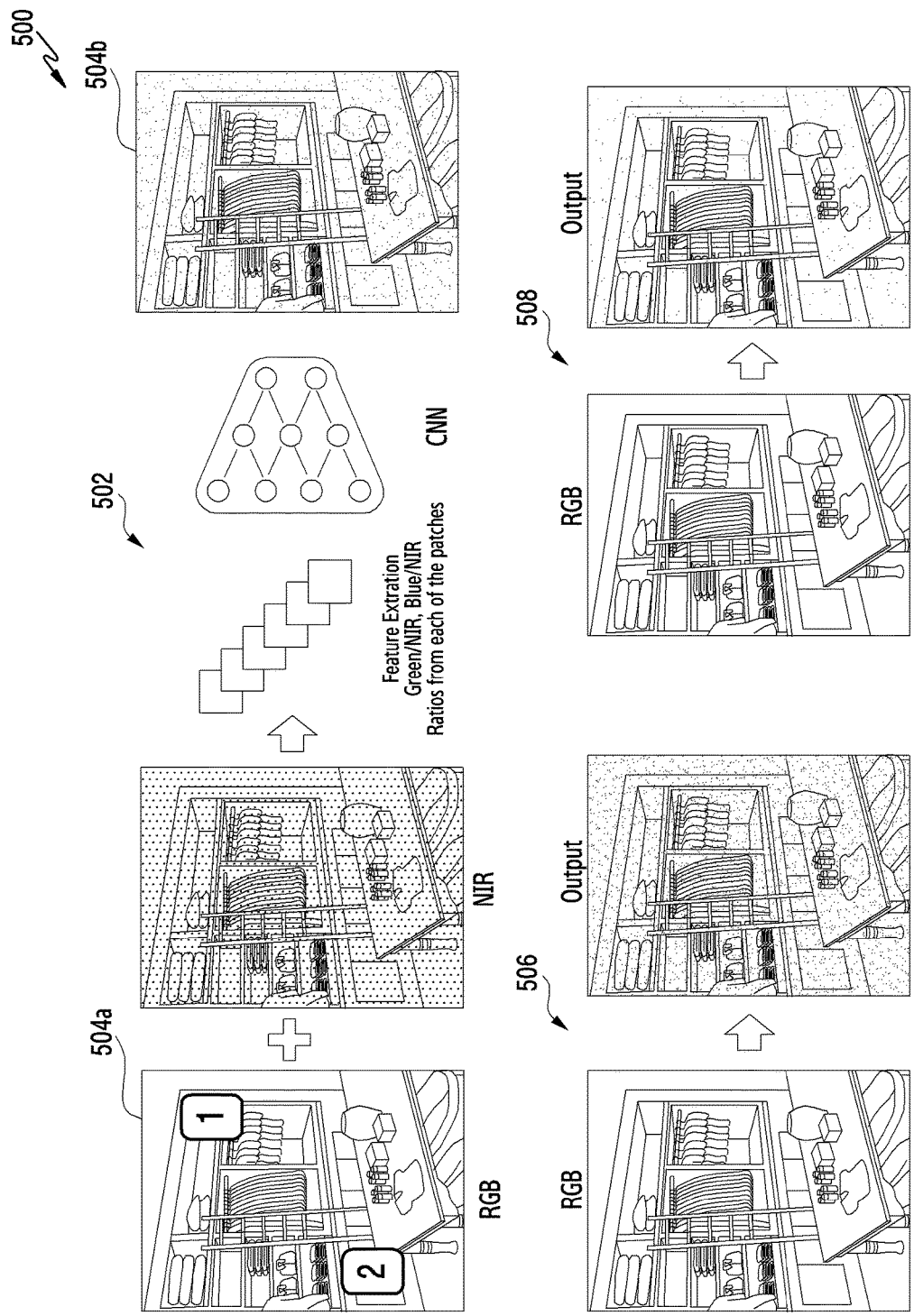
FIG. 5 is a schematic diagram illustrating a case of using a mixed lighting, according to an example embodiment.

FIG. 5 is a schematic diagram 500 illustrating a case of using a mixed lighting, according to an example embodiment. According to the FIG. 5, in an example embodiment as shown in operation 502, an image is received by a composite image sensor of a user equipment (UE). Upon receiving the image, the composite image sensor identifies two illumination sources in RGB frame 504a of the image: one from candles present in the room, and another from daylight. The composite image sensor obtains a NIR frame for the image. Based on the obtained RGB and NIR frames, features are extracted that include, but are not limited to, green/NIR, blue/NIR ratios from each patch and the like. For the extracted patch, the CNN can be applied to obtain an illuminant estimate. Based on the obtained illuminant estimate, the composite image sensor attempts to find a balance between a tungsten approach and a fluorescent approach, and based on the identified balance, the image can be smoothed and correction can be done in the image to obtained corrected image 504b.

In another example embodiment, as shown in operation 506, upon performing the CNN and obtaining an illuminant estimate, the composite image sensor identifies tungsten as the prominent illuminant source in the image. Based on the identified illuminant source, the composite image sensor applies an auto-white balance method to the RGB frame of the image to smooth the image and correct it according to the identified tungsten illuminant source.

In another example embodiment, as shown in operation 508, upon performing the CNN and obtaining an illuminant estimate, the composite image sensor identifies fluorescent light as prominent illuminant source in the image. Based on the identified illuminant source, the composite image sensor applies the AWB method to the RGB frame of the image to smooth the image and correct it according to the identified fluorescent illuminant source.

Figure 6:
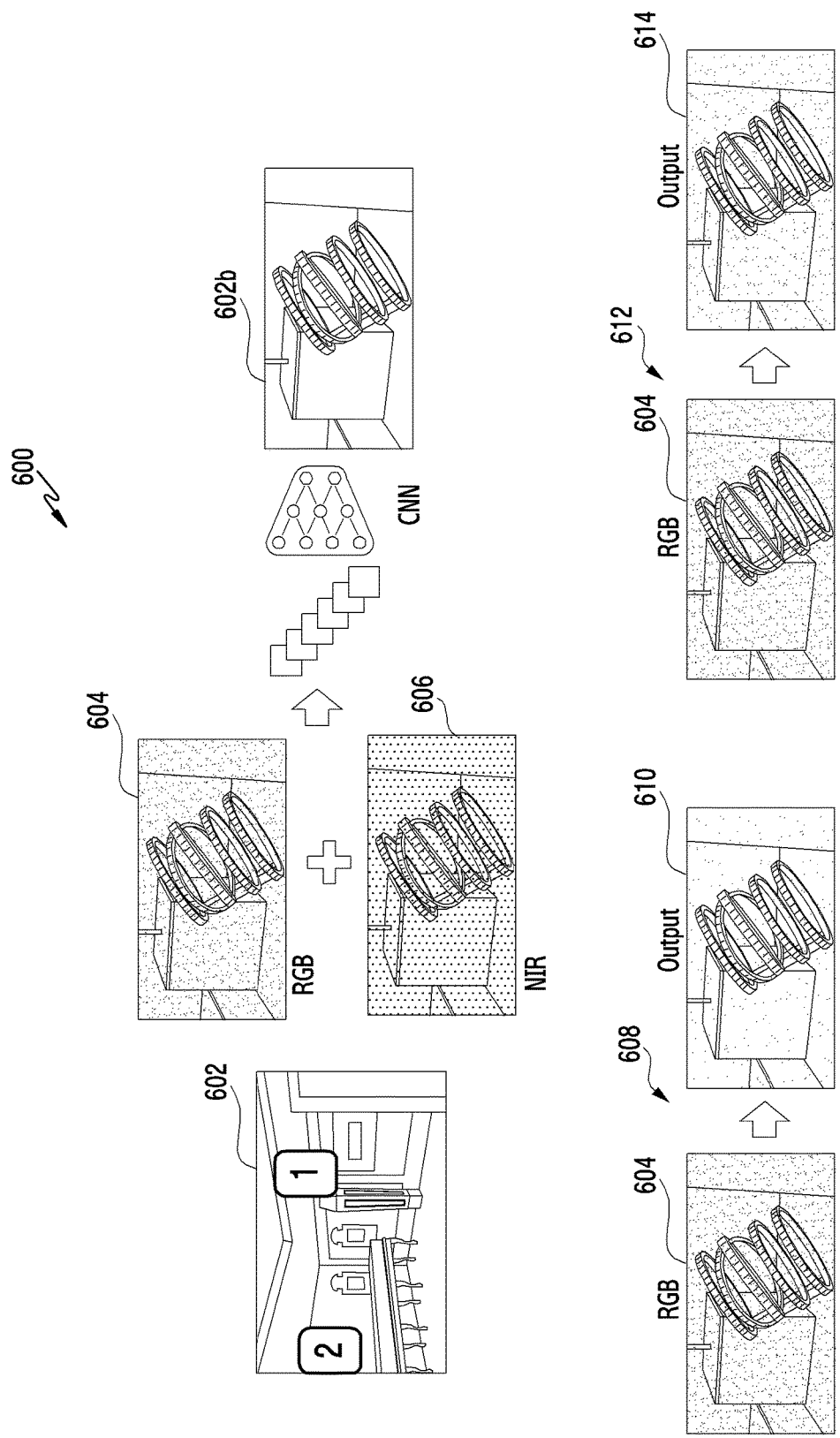
FIG. 6 is a schematic diagram illustrating a case of using mixed lighting, according to another embodiment.

FIG. 6 is a schematic diagram 600 illustrating a case of using mixed lighting, according to another example embodiment. According to the FIG. 6, an image 602 of a jewelry shop is received by a composite image sensor of a UE. Upon receiving the image, the composite image sensor identifies two illumination sources: a tungsten source and a fluorescent source. The composite image sensor obtains an RGB frame 604 and an NIR frame 606 for the image 602. Based on the obtained RGB frame 604 and NIR frame 606, features are extracted that include, but are not limited to, green/NIR, blue/NIR ratios from each patch and the like. For the extracted patch, the CNN can be applied to obtain an illuminant estimate. Based on the obtained illuminant estimate, the composite image sensor attempts to find a balance between a tungsten approach and a fluorescent approach, and based on the identified balance, the image can be smoothed and correction can be done in the image to obtain corrected image 602b.

In another example embodiment, as shown in operation 608, upon performing the CNN on the RGB frame 604, and obtaining an illuminant estimate, the composite image sensor identifies tungsten as the prominent illuminant source in the image 602. Based on the identified illuminant source, the composite image sensor applies the AWB method to the RGB frame 604 of the image 602 to smooth the image 602 and correct it according to the identified tungsten illuminant source to obtain corrected image 610.

In another example embodiment, as shown in operation 612, upon performing the CNN and obtaining an illuminant estimate, the composite image sensor identifies fluorescent light as the prominent illuminant source in the image 602. Based on the identified illuminant source, the composite image sensor applies the auto-white balance method to the RGB frame 604 of the image 602 to smooth the image 602 and correct it according to the identified fluorescent light illuminant source to obtain corrected image 614.

Figure 7:
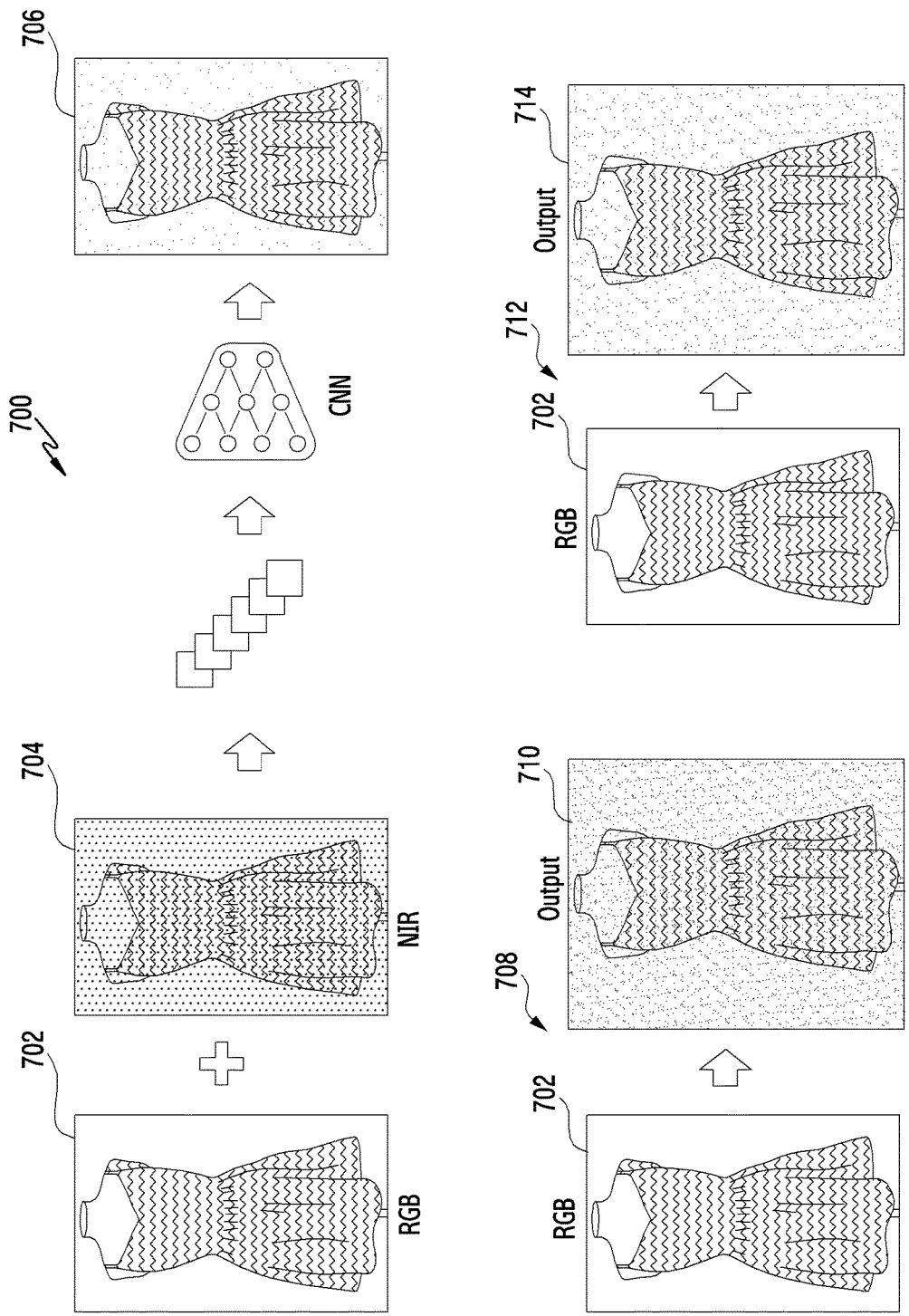
FIG. 7 is a schematic diagram illustrating a case of using mixed lighting, according to another embodiment.

FIG. 7 is a schematic diagram 700 illustrating a case of using mixed lighting, according to another example embodiment. According to the FIG. 7, an image of a dress is received by a composite image sensor of a UE. Upon receiving the image, the composite image sensor identifies two illumination sources: a tungsten source and a fluorescent source. The composite image sensor obtains an RGB frame 702 and an NIR frame 704 for the image.

Based on the obtained RGB frame 702 and the NIR frame 704, features are extracted that include, but are not limited to, green/NIR, blue/NIR ratios from each patch and the like. For the extracted patch, the CNN can be applied to obtain an illuminant estimate. Based on the obtained illuminant estimate, the composite image sensor attempts to find a balance between a tungsten approach and a fluorescent approach, and based on the identified balance, the image can be smoothed and correction can be done in the image to obtain corrected image 706.

In another example embodiment, as shown in operation 708, upon performing the CNN on the RGB frame 702, and obtaining an illuminant estimate, the composite image sensor identifies tungsten as the prominent illuminant source in the image. Based on the identified illuminant source, the composite image sensor applies the auto-white balance method to the RGB frame 702 of the image to smooth the image and correct it according to the identified tungsten illuminant source to obtain corrected image 710.

In another example embodiment, as shown in operation 712, upon performing the CNN and obtaining an illuminant estimate, the composite image sensor identifies fluorescent light as the prominent illuminant source in the image. Based on the identified illuminant source, the composite image sensor applies auto-white balance method to the RGB frame 702 of the image to smooth the image and correct it according to the identified fluorescent illuminant source to obtain corrected image 714.

The present example embodiments have been described; it will be evident that various modifications and changes may be made to these embodiments without departing from the broader spirit and scope of the various embodiments. Furthermore, blocks, which may be referred to as the various devices, modules, and the like described herein, may be enabled and operated using hardware circuitry, for example, complementary metal oxide semiconductor-based logic circuitry, firmware, software and/or any combination of hardware, firmware, and/or software embodied in a machine readable medium. For example, the various electrical structures and methods may be embodied using transistors, logic gates, and electrical circuits, such as application specific integrated circuit. The circuit constituting a block may be implemented by dedicated hardware, or by a processor (e.g., one or more programmed microprocessors and associated circuitry), or a combination of dedicated hardware to perform some functions of the block and a processor to perform other functions of the block.

While the disclosure has been shown and described with reference to various example embodiments thereof, it will be understood by those skilled in the art that various changes in form and details may be made therein without departing from the spirit and scope as defined by the appended claims and their equivalents.

What is claimed is:

1. A method for detecting light sources in a multi-illuminated environment, the method comprising:
    detecting a multi-illuminant area using a visible raw image and a near-infrared (NIR) raw image of an image obtained using a composite RGB-IR sensor;
    dividing each of the visible raw image and the NIR raw image into a plurality of grid samples;
    extracting a plurality of illuminant features based on a green/NIR pixel ratio and a blue/NIR pixel ratio;
    estimating at least one illuminant feature for each of the plurality of grid samples by passing the each of the plurality of grid samples through a convolution neural network (CNN) module using the extracted plurality of illuminant features;
    processing the image based on the estimated at least one illuminant feature; and
    displaying the processed image on a display panel of an electronic device.

2. The method of claim 1, wherein the processing the image based on the estimated at least one illuminant feature comprises:
    smoothing each of the plurality of grid samples based on the estimated at least one illuminant feature; and
    applying an auto-white-balance (AWB) to each of the smoothed grid samples.

3. The method of claim 1, further comprises providing a pre-defined set of standard illuminants to the CNN.

4. The method of claim 1, wherein the dividing each of the visible raw image and the NIR raw image into a plurality of grid samples comprises using at least one of a grid-based sampling, a segmentation-based sampling, and a sparse sampling.

5. The method of claim 1, wherein the CNN is trained with a pre-defined set of standard illuminants and natural lighting and ground truth illuminant information.

6. The method of claim 1, wherein the estimating at least one illuminant feature comprises: measuring an angular error of the image by comparing the estimated at least one illuminant feature with a pre-defined set of standard illuminants stored in the CNN; and selecting the at least one illuminant feature based on the measured angular error.

7. The method of claim 3, wherein the providing the pre-defined set of standard illuminants to the CNN comprises:
    capturing a single image using the RGB-IR sensor;
    separating the single image into an R layer, a G layer, a B layer, and an IR layer;
    dividing each of an input RGB image and an input NIR image into a plurality of patches of a pre-defined size; and
    providing the CNN with a pre-defined size input image and a corresponding known illuminant estimate.

8. The method of claim 1, wherein the illuminant comprises one or more light sources present in a scene captured by the RGB-IR sensor.

9. The method of claim 1, further comprising:
    separating the image into the visible raw image and the NIR raw image.

10. An electronic device for detecting light sources in a multi-illuminated environment, the electronic device comprises:
    a composite red-green-blue-infrared (RGB-IR) sensor configured to obtain an image; and
    at least one processor configured to:
        detect a multi-illuminant area using a visible raw image and a near-infrared (NIR) raw image of the image obtained using a composite RGB-IR sensor;
        divide each of the visible raw image and the NIR raw image into a plurality of grid samples;
        extract a plurality of illuminant features based on a green/NIR pixel ratio and a blue/NIR pixel ratio;
        estimate at least one illuminant feature for each of the plurality of grid samples by passing the each of the plurality of grid samples through a convolution neural network (CNN) module using the extracted plurality of illuminant features;
        process the image based on the estimated at least one illuminant feature; and
        display the processed image on a display panel of the electronic device.

11. The electronic device of claim 10, wherein the at least one processor is further configured to:
    smooth each of the plurality of grid samples based on the estimated at least one illuminant feature; and
    apply an auto-white-balance (AWB) to each of the smoothed grid samples.

12. The electronic device of claim 10, wherein the at least one processor is further configured to provide a pre-defined set of standard illuminants to the CNN.

13. The electronic device of claim 10, wherein the at least one processor is further configured to divide each of the visible raw image and the NIR raw image into the plurality of grid samples by using at least one of a grid-based sampling, a segmentation-based sampling, and a sparse sampling.

14. The electronic device of claim 10, wherein the CNN is trained with a pre-defined set of standard illuminants and natural lighting and ground truth illuminant information.

15. The electronic device of claim 10, wherein the at least one processor is further configured to estimate the at least one illuminant feature for each of the plurality of grid samples by: measuring an angular error of the image by comparing the estimated at least one illuminant feature with a pre-defined set of standard illuminants stored in the CNN; and selecting the at least one illuminant feature based on the measured angular error.

16. The electronic device of claim 12, wherein the at least one processor, in order to provide the pre-defined set of standard illuminants to the CNN, is further configured to:
  control the RGB-IR sensor to capture a single image;
  separate the single image into an R layer, a G layer, a B layer, and an IR layer;
  divide each of an input RGB image and an input NIR image into a plurality of patches of a pre-defined size; and
  provide the CNN with a pre-defined size input image and a corresponding known illuminant estimate.

17. The electronic device of claim 10, wherein the illuminant comprises one or more light sources present in a scene captured by the RGB-IR sensor.

18. The electronic device of claim 10, wherein the at least one processor is further configured to:
  separate the image into the visible raw image and the NIR raw image.

* * * * *